(12) United States Patent
Bondy et al.

(10) Patent No.: US 11,559,849 B2
(45) Date of Patent: Jan. 24, 2023

(54) STRAIN RELIEF CLASPS

(71) Applicant: ILLINOIS TOOL WORKS INC., Glenview, IL (US)

(72) Inventors: Craig Matthew Bondy, Windsor (CA); Jeffrey Gerald Wells, Belle River (CA)

(73) Assignee: ILLINOIS TOOL WORKS INC., Glenview, IL (US)

( * ) Notice: Subject to any disclaimer, the term of this patent is extended or adjusted under 35 U.S.C. 154(b) by 34 days.

(21) Appl. No.: 16/962,893

(22) PCT Filed: Feb. 26, 2018

(86) PCT No.: PCT/US2018/019684
§ 371 (c)(1),
(2) Date: Jul. 17, 2020

(87) PCT Pub. No.: WO2019/164528
PCT Pub. Date: Aug. 29, 2019

(65) Prior Publication Data
US 2021/0060689 A1    Mar. 4, 2021

(51) Int. Cl.
*B23K 9/173*    (2006.01)
*B23K 9/29*    (2006.01)
*B23K 9/32*    (2006.01)

(52) U.S. Cl.
CPC .............. *B23K 9/173* (2013.01); *B23K 9/291* (2013.01); *B23K 9/32* (2013.01)

(58) Field of Classification Search
CPC .......... B23K 9/173; B23K 9/291; B23K 9/32; B23K 9/295; B23K 9/323
USPC ........... 219/74, 70, 75, 129, 121.36, 121.39, 219/121.4, 121.48, 121.49, 121.5, 121.55, 219/121.56, 121.57, 124.31, 124.32, 219/124.33, 124.4, 124.5, 139, 227, 533
See application file for complete search history.

(56) References Cited

U.S. PATENT DOCUMENTS

| | | | | |
|---|---|---|---|---|
| 3,395,244 A | * | 7/1968 | Koehler | ............... H01R 13/562 |
| | | | | 174/135 |
| 4,052,116 A | * | 10/1977 | Sanders | ................. B23K 9/013 |
| | | | | 439/27 |
| 4,945,209 A | | 7/1990 | Mann | |

(Continued)

FOREIGN PATENT DOCUMENTS

| CA | 2443809 A1 | 5/2004 |
|---|---|---|
| WO | 2007112771 | 10/2007 |

OTHER PUBLICATIONS

International Search Report and Written Opinion for PCT Patent Application No. PCT/US2018/019684 dated Nov. 22, 2018. 9 Pages.

*Primary Examiner* — Tu B Hoang
*Assistant Examiner* — Vy T Nguyen
(74) *Attorney, Agent, or Firm* — McAndrews, Held & Malloy, Ltd.

(57) ABSTRACT

The present disclosure relates to a welding torch having a clasp (300) that couples a protective sleeve (150) to a welding torch through a strain relief (200). The protective sleeve (150) encloses a welding cable assembly. The strain relief (200) encircles a portion of the protective sleeve (150). The protective sleeve (150) is further fitted over a ball swivel that is coupled to a handle (38) of the welding torch. The clasp (300) clamps over the strain relief (200), protective sleeve (150), and ball swivel to securely couple the protective sleeve (150) to the welding torch.

20 Claims, 5 Drawing Sheets

(56) References Cited

U.S. PATENT DOCUMENTS

| | | | |
|---|---|---|---|
| 5,965,045 A | 10/1999 | Zigliotto | |
| 6,419,417 B1* | 7/2002 | Zigliotto | B23K 9/287 |
| | | | 219/137.63 |
| 6,671,382 B2* | 12/2003 | Chen | H01R 35/02 |
| | | | 381/189 |
| 7,196,284 B2 | 3/2007 | Barten | |
| 8,993,928 B2 | 3/2015 | Laymon | |
| 9,186,746 B2 | 11/2015 | Cossette et al. | |
| 9,242,307 B2* | 1/2016 | Barker | B23K 9/32 |
| 9,833,858 B2 | 12/2017 | Sammons | |
| 2007/0108173 A1* | 5/2007 | Zamuner | B23K 9/32 |
| | | | 219/137.31 |
| 2010/0096374 A1 | 4/2010 | Karpoff et al. | |
| 2011/0062130 A1 | 3/2011 | Barker et al. | |
| 2013/0267109 A1 | 10/2013 | Chawgo | |
| 2014/0069904 A1 | 3/2014 | Sammons | |
| 2014/0110386 A1 | 4/2014 | Centner | |
| 2014/0231399 A1 | 8/2014 | Kondo | |
| 2016/0336682 A1 | 11/2016 | Markefka | |
| 2017/0165780 A1 | 6/2017 | Centner | |

\* cited by examiner

STRAIN RELIEF CLASPS

TECHNICAL FIELD

The present disclosure generally relates to welding torches and, more particularly, to clasps that couple strain reliefs to the welding torches.

BACKGROUND

Welding torches are sometimes coupled to welding-type power sources and/or other welding-type components (e.g. wire feeder, gas supply, etc.) through one or more cable assemblies. The cable assemblies may be enclosed in a protective covering to keep them together and/or shielded from the environment. The covering may be coupled to the welding torch using a cheap and simple method, such as through an elastic band embedded in the covering (or using a natural elasticity of the covering). However, keeping the covering in place over time with such connection can be a challenge. For examples, manipulations of the welding torch during operation may stress the elastic connection. Over time, the stresses may loosen the connection, causing the covering to retreat over time, thereby exposing the underlying components.

BRIEF SUMMARY

Systems and methods are provided for clasps that couple strain reliefs to welding torches, substantially as shown in and/or described in connection with at least one of the figures, as set forth more completely in the claims.

These and other advantages, aspects and novel features of the present invention, as well as details of an illustrated example thereof, will be more fully understood from the following description and drawings.

BRIEF DESCRIPTION OF THE DRAWINGS

The figures are not necessarily to scale. Similar or identical reference numerals may be used to refer to similar or identical components.

DETAILED DESCRIPTION OF THE INVENTION

Figure 1:
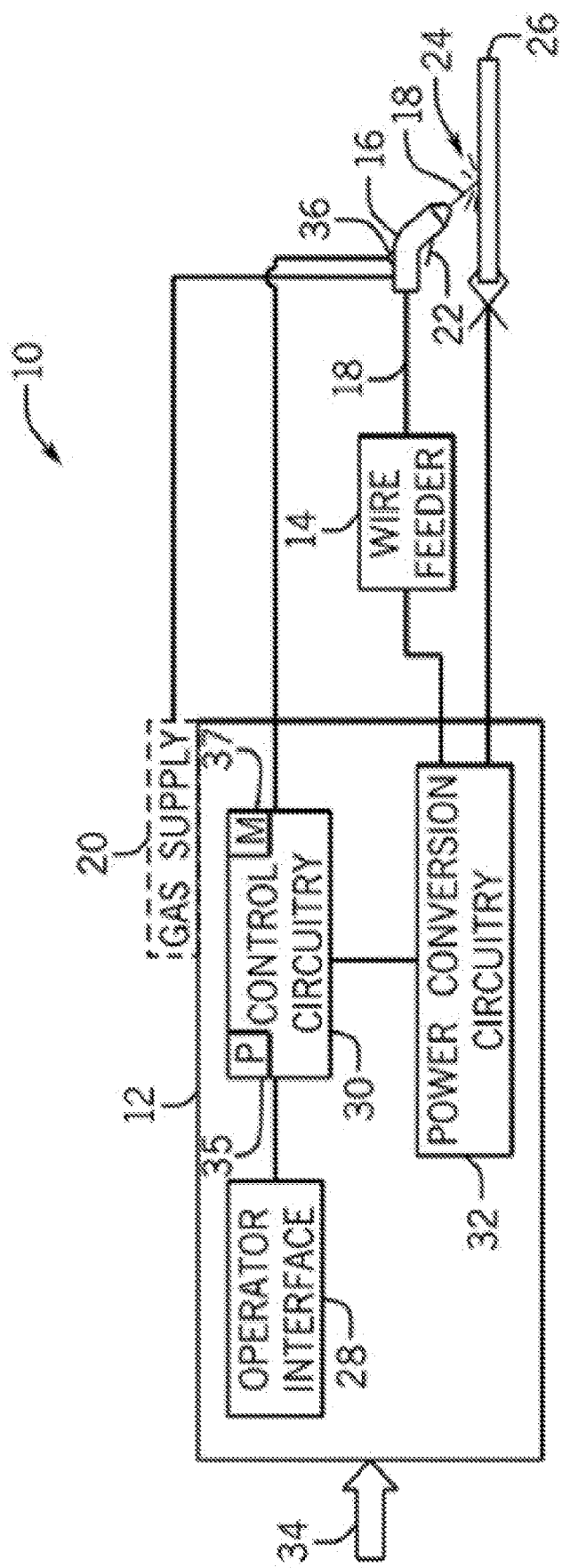
FIG. 1 is an example of a welding system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z) }. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

The terms "coupled," "coupled to," and "coupled with" as used herein, each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, the terms "front" and/or "forward" refer to locations closer to a welding arc, while "rear" refers to locations farther from a welding arc.

Some examples of the present disclosure relate to a clasp that couples a protective sleeve to a welding torch through a strain relief. The protective sleeve encloses a welding cable assembly. The strain relief encircles a portion of the protective sleeve. The protective sleeve is further fitted over a ball swivel that is coupled to a handle of the welding torch. The clasp clamps over the strain relief, protective sleeve, and ball swivel to securely couple the protective sleeve tot the welding torch.

FIG. 1 shows an example of a welding-type system 10 that may use the example welding torch, clasp, strain relief, and/or protective sleeve discussed above and/or below. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some examples, may be integral with the power source 12. In some examples, the wire feeder 14 may be removed from the system 10 entirely. In the example of FIG. 1, the power source 12 supplies welding-type power to a torch 16 through the wire feeder 14. In some examples, the power source 12 may supply welding-type power directly to the torch 16 rather than through the wire feeder 14. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In some examples, the welding system 10 may receive weld settings from the operator via an operator interface 28 provided on the power source 12 (and/or power source housing). The weld settings may be communicated to control circuitry 30 within the power source 12. In some examples, the control circuitry 30 operates to control generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources. In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

Figure 2A:
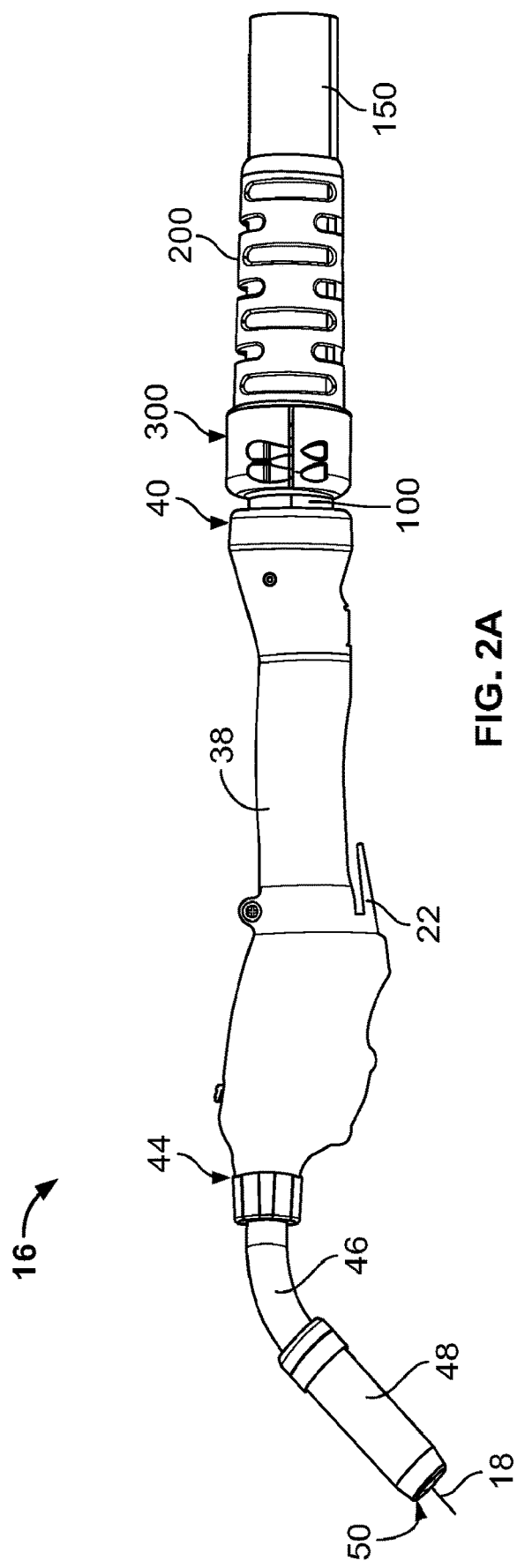
FIG. 2a is a side view of an example welding torch, in accordance with aspects of this disclosure.
Figure 2B:
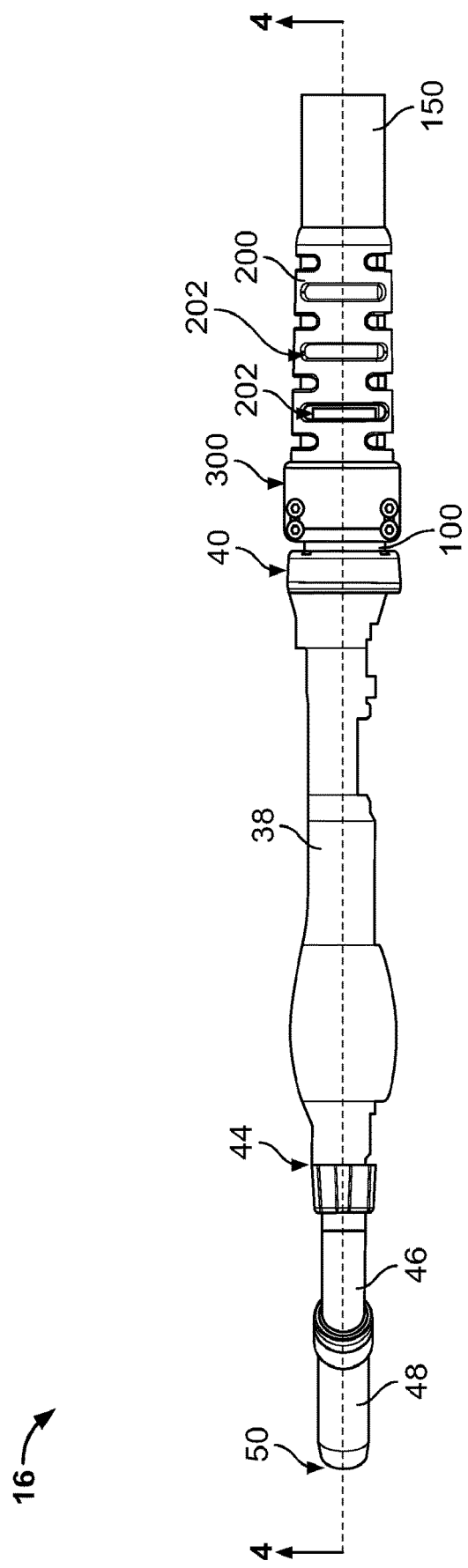
FIG. 2b is a top plan view of the example welding torch of FIG. 2a, in accordance with aspects of this disclosure.

FIGS. 2a and 2b are side and top views, respectively, of an example welding torch 16 that may be used in and/or with the example welding system of FIG. 1. As discussed in relation to FIG. 1, the torch 16 includes the trigger 22 for initiating a weld (and/or other welding-type operation) and/or supplying the electrode 18 to the weld. Specifically, the trigger 22 is disposed on a handle 38. A welding operator may hold the handle 38 when performing a weld. The torch 16 also includes a gooseneck 46 extending out of a front end 44 of the handle 38. As such, the gooseneck 46 is coupled between the handle 38 and a welding nozzle 48.

At a rear end 40, the handle 38 is coupled to a ball swivel 100. The ball swivel 100 is configured to allow the torch 16 (and/or torch handle 38) to rotate about multiple axes during operation. In some examples, the ball swivel 100 may instead comprise a different type of swivel connector, or some other type of connector. In the example of FIGS. 2a and 2b, the ball swivel 100 is coupled to a protective sleeve 150 that encloses a cable assembly 152. In some examples, the protective sleeve 150 may enclose a plurality of cable assemblies. Each cable assembly 152 may include one or more cables (e.g., conductors, conductor bundles, etc.), wires, lines, hoses, liners, filler, insulation, gaps, and/or any other content. In some examples, the cables are welding cables that provide electrical power, welding consumables (e.g., the electrode, the shielding gas, coolant, and so forth), and/or other welding supplies to the torch 16. Welding consumables, such as filler wire and/or gas, generally travel through cable assembly 152 into the handle 38 through the rear end 40 of the handle and exit at the front end 44 end of the handle. When the trigger 22 is pressed or actuated, welding wire (e.g., electrode 18) travels through a cable assembly 152, the handle 38, the gooseneck 46, and the welding nozzle 48, so that the welding wire extends out of an end 50 (i.e., torch tip) of the welding nozzle 48.

In the example of FIGS. 2a and 2b, a rubber strain relief 200 encircles the protective sleeve 150. In some examples, the strain relief 200 may be formed of a different material instead of rubber, such as plastic, fabric, metal, composite, and/or some other appropriate material. The strain relief 200 includes slits 202 that expose portions of the protective sleeve 150. The strain relief 200 resists kinking of the protective sleeve 150, and/or the cable assembly 152 within the protective sleeve 150, proximate to the handle 38. In the example of FIGS. 2a and 2b, an annular clasp 300 is clamped over the strain relief 200, the protective sleeve 150, and the ball swivel 100. While the example torch 16 illustrated in FIGS. 2a and 2b is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc.

Figure 3:
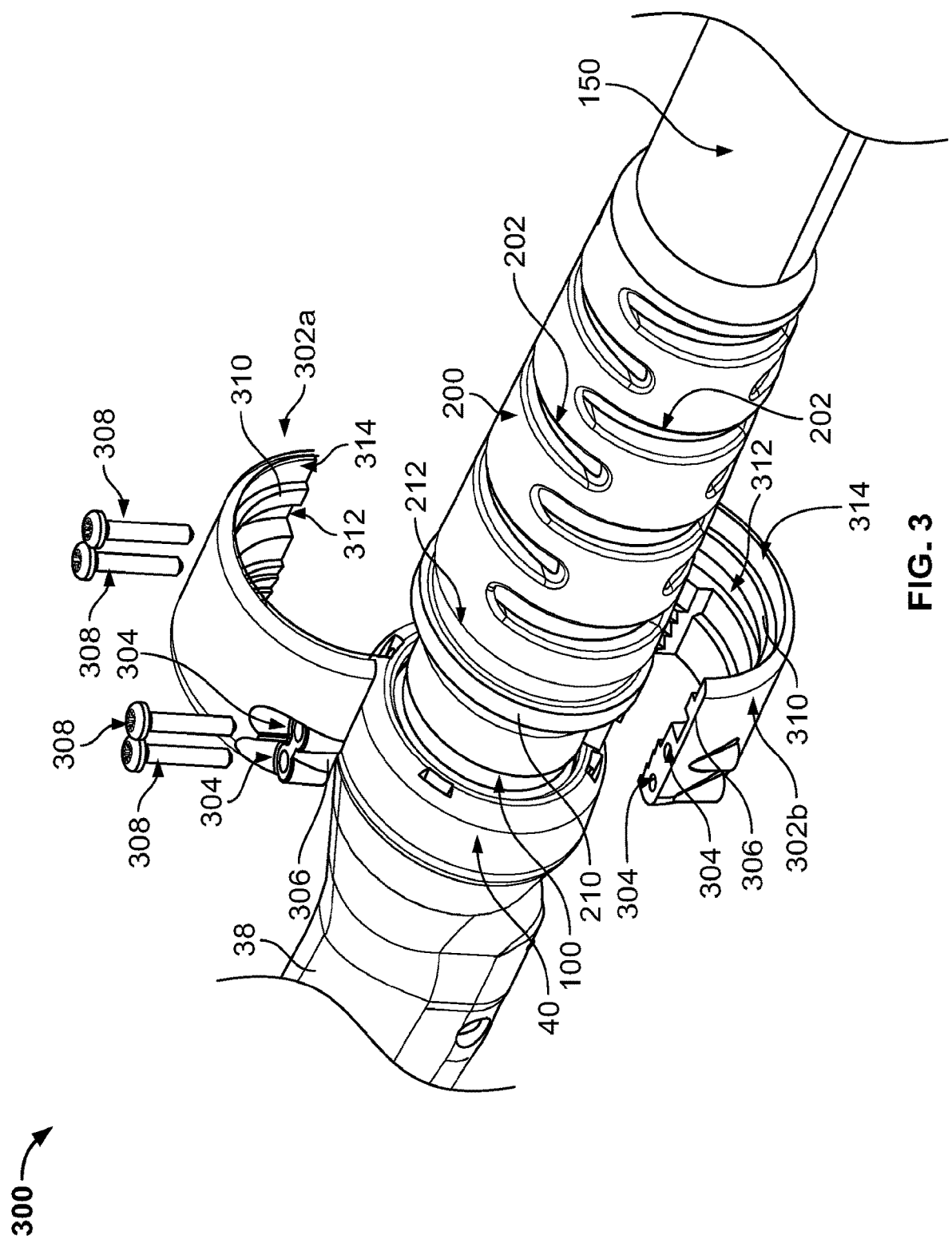
FIG. 3 is an exploded perspective view of an example clasp, illustrating an arrangement with the example welding torch of FIG. 2a, in accordance with aspects of this disclosure.

FIG. 3 shows how the example clasp 300 clamps over the strain relief 200, the protective sleeve 150, and the ball swivel 100. The clasp 300 may be comprised of a rubber, plastic, fabric, metal, composite, and/or other appropriate material. As shown in the example of FIG. 3, the clasp 300 comprises a first section 302a and a second section 302b. Each section 302 comprises approximately one hemisphere (and/or half) of the annular clasp 300. Channels 304 are formed in the sections 302 proximate ends 306 of each section 302. The channels 304 are configured to receive fasteners 308 (e.g. screws, bolts, etc.). The channels 304 of the first section 302a are complementary to the channels 304 of the second section 302b. When the sections 302 are put together with the channels 304 aligned, the fasteners 308 may be extended through the channels 304 to couple the first section 302a to the second section 302b. In the example of FIG. 3, each section 302 of the clasp 300 includes four channels 304 (with two channels 304 on each side of each section 302). The channels 304 are configured to receive four fasteners 308. In some examples, the clasp 300 may include one or more other fastening mechanism to couple the first section 302a to the second section 302b (e.g. snaps, hook and loop fasteners, adhesive, magnets, etc.).

Figure 4:
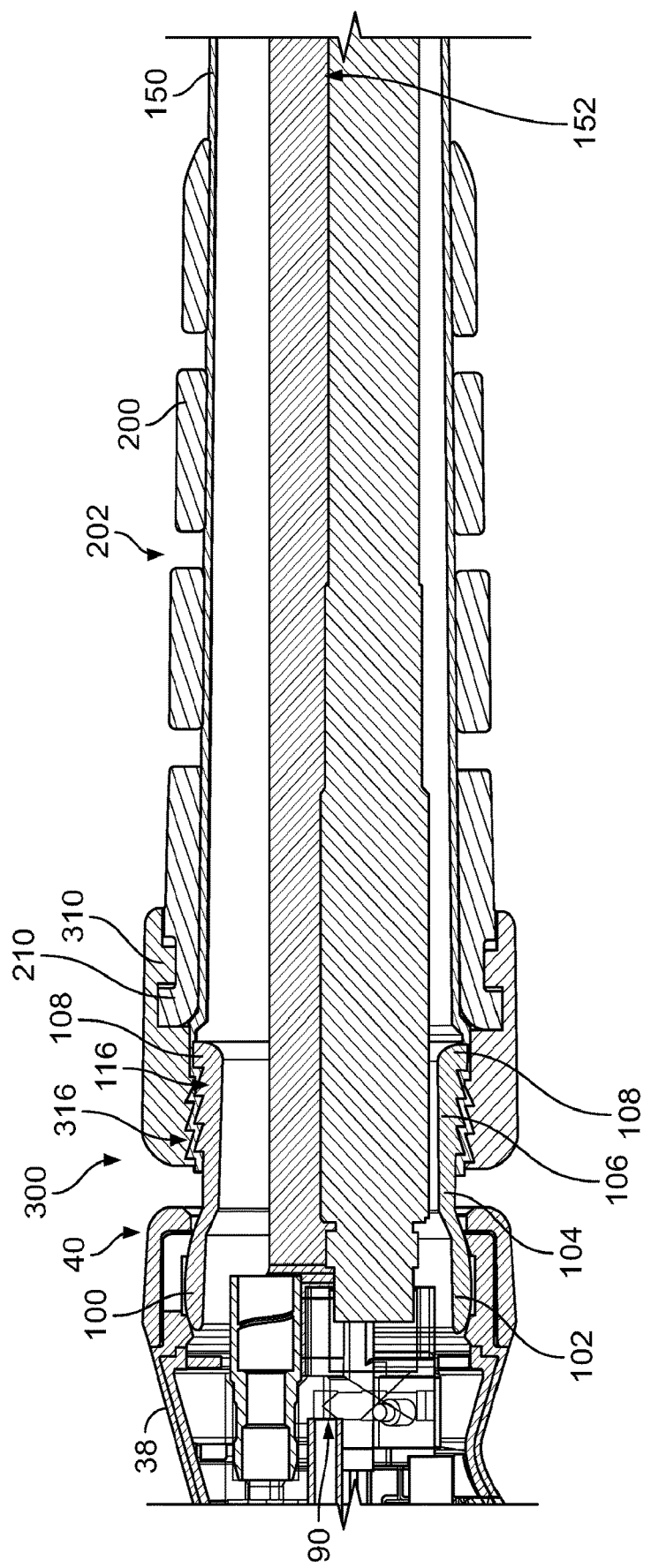
FIG. 4 is a partial cross-sectional view of the example welding torch of FIG. 2a, along the line 4-4 in FIG. 2b.

As shown in the example of FIG. 3, the clasp 300 includes an annular ridge 310 and an annular trench 312 on an internal surface 314 of the clasp 300. More particularly, each section 302 of the clasp 300 includes approximately half of the annular ridge 310 and/or annular trench 312. The strain relief 200 includes an annular trench 212 complementary to the annular ridge 310 of the clasp 300. The strain relief 200 also includes an annular ridge 210 complementary to the annular trench 312 of the clasp 300. These complementary formations align and interlock (and/or engage) when the clasp 300 clamps over the strain relief 200, and helps to securely couple the clasp 300 to the strain relief 200. FIG. 4 shows the annular clasp 300 clamped over the strain relief 200, with the ridge 310 of the clasp 300 positioned within (and/or engaged to, interlocked with, etc.) the trench 212 of the strain relief 200. Likewise, the ridge 210 of the strain relief 200 is positioned within (and/or engaged to, interlocked with, etc.) the trench 312 of the clasp 300.

As shown in the example of FIG. 4, the clasp 300 is clamped over the strain relief 200, the protective sleeve, and the ball swivel 100. The ball swivel 100 has a handle portion 102, an intermediate portion 104, and a sleeve portion 106. The handle portion 102 of the ball swivel 100 is positioned within (and/or coupled to) the handle 38 of the torch 16. The protective sleeve 150 is positioned over the sleeve portion 106 of the ball swivel 100. The intermediate portion 104 of the ball swivel 100 comprises a portion between the handle portion 102 and the sleeve portion 106 that is covered by neither the handle 38 of the torch 16, nor the protective sleeve 150 (and/or clasp 300). In some examples, the intermediate portion 104 may be small, negligible, or non-existent.

As shown in the example of FIG. 4, the entire ball swivel 100, including the handle portion 102, has a hollow interior. The handle portion 102 is approximately hemispherical, with a curved profile, resembling half of a tennis ball. In some examples, welding-type components 90 are positioned within an interior of the handle 38 of the torch 16 proximate to the handle portion 102 of the ball swivel 100. In the example of FIG. 4, some of the welding components 90 are positioned within the handle portion 102 of the ball swivel 100. In some examples, the welding-type components 90 may include electrical components, gas supply components, wire feeder components, coolant components, and/or other components appropriate for use within the torch 16 of the welding-type system 10. In the example of FIG. 4, the welding components 90 are coupled to the cable assembly 152. In some examples, one or more welding components 90 may be coupled to one or more cable assemblies 152. In the example of FIG. 4, the cable assembly 152 extends through the protective sleeve 150, the sleeve portion 106 of the ball swivel 100, the intermediate portion 104 of the ball swivel 100, and part of the handle portion 102 of the ball swivel 100 to couple to the welding components 90 within the handle portion 102. In some examples, the cable assembly 152 may couple to the welding components 90 within the handle 38.

In the example of FIG. 4, the sleeve portion 106 is substantially annular. The clasp 300 clamps down on the protective sleeve 150 over the sleeve portion 106 of the ball swivel 100 to secure the protective sleeve 150 to the ball swivel 100 (thereby securing the protective sleeve to the handle 38 and/or torch 16 via the ball swivel 100). The ends 108 of the sleeve portion 106 of the ball swivel 100 are flared outward to increase friction (and/or grip, engagement, etc.) between the handle portion 102 of the ball swivel 100 and the protective sleeve 150, so as to help hold the protective sleeve 150 in place on the handle portion 102 of the ball swivel 100. An outer surface of the handle portion 102 also includes barbs 116 configured to help hold the protective sleeve 150 in place on the handle portion 102 of the ball swivel 100. More particularly, the barbs 116 increase the friction between the handle portion 102 of the ball swivel 100 and the protective sleeve 150. In the example of FIG. 4, the internal surface 314 of the clasp 300 includes complementary barbs 316 configured to interact with the barbs 116 of the ball swivel 100 to hold the protective sleeve 150 in place between the clasp 300 and ball swivel 100. Additionally, the compressive force of the clasp 300 when it is clamped over the protective sleeve 150 and ball swivel 100 helps to hold the protective sleeve 150 securely in place between the clasp 300 and the ball swivel 100. In some examples, the handle portion 102 and/or clasp 300 may have additional and/or alternative features to increase friction (e.g. knurls, bumbs, grooves, pins, etc.).

In operation, the clasp 300 retains the protective sleeve 150 to the ball swivel 100 by compressing the protective sleeve 150 against the ball swivel 100. The barbs 116 of the ball swivel 100 and complementary barbs 316 of the clasp 300 add additional frictional retaining force to help keep the protective sleeve 150 in place, as may the flared ends 108 of the ball swivel 100. Additionally, the clasp 300 holds the strain relief 200 in the proper position relative to the protective sleeve 150 and ball swivel 100. Thus, an operator may perform welding-type tasks with the torch 16 without the protective sleeve 150 retreating and/or coming loose from the ball swivel 100, which might expose the cable assembly 152 and/or welding components 90 to contaminants and/or pollutants in the surrounding environment.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding torch, comprising:
   a handle;
   a connector comprising
      a first connector portion extending away from the handle, and
      a second connector portion connected to the handle;
   a sleeve comprising
      a first sleeve portion that encircles the first connector portion that extends away from the handle, and
      a second sleeve portion that is not in contact with the connector;
   a strain relief encircling the second sleeve portion that is not in contact with the connector, the strain relief not encircling the connector; and
   an annular clasp that clasps the strain relief and clamps the first sleeve portion against the first connector portion.

2. The welding torch of claim 1, wherein the connector comprises a swivel connector.

3. The welding torch of claim 2, wherein the handle contains one or more welding components, and wherein the sleeve contains a cable assembly that extends through the connector to connect with the one or more welding components.

4. The welding torch of claim 1, wherein the strain relief comprises a rubber material.

5. The welding torch of claim 1, wherein the second connector portion of the connector is positioned within the handle and the first connector portion extends outside of the handle.

6. The welding torch of claim 5, wherein the annular clasp clamps the first sleeve portion against the first connector portion at a first clasp portion of the annular clasp, and clasps the strain relief at a second clasp portion of the annular clasp, the first clasp portion having a first thickness that is greater than a second thickness of the second clasp portion.

7. The welding torch of claim 6, further comprising barbs positioned on the first connector portion of the connector, wherein the clasp comprises complementary barbs.

8. The welding torch of claim 1, wherein the clasp comprises a first section and a second section coupled to the first section around the first connector portion, the first sleeve portion, and the strain relief.

9. The welding torch of claim 1, wherein the strain relief comprises an annular trench and an inner surface of the clasp comprises an annular ridge that fits in and engages the annular trench.

10. The welding torch of claim 1, wherein an inner surface of the clasp comprises an annular trench and the strain relief comprises an annular ridge that fits in and engages the annular trench.

11. A welding system, comprising:
- a power supply configured to generate electrical power;
- a cable assembly connected with the power supply;
- a sleeve enclosing the cable assembly, the sleeve comprising a first sleeve portion and a second sleeve portion;
- a welding torch configured to receive the electrical power via the cable assembly, the welding torch having a handle;
- a connector comprising a first connector portion extending away from the handle and a second connector portion connected to the handle,
- the first sleeve portion encircling the first connector portion extending away from the handle, and the second sleeve portion being out of contact with the connector;
- a strain relief encircling the second sleeve portion that is out of contact with the connector, the strain relief not encircling the connector; and
- an annular clasp that clasps the strain relief and clamps the sleeve against the connector.

12. The welding system of claim 11, wherein the connector comprises a swivel connector.

13. The welding system of claim 12, wherein the handle contains one or more welding components, and wherein the cable assembly extends through the connector to connect with the one or more welding components.

14. The welding system of claim 11, wherein the strain relief comprises a rubber material.

15. The welding system of claim 11, wherein the second connector portion of the connector is positioned within the handle and the first connector portion extends outside of the handle.

16. The welding system of claim 15, wherein the annular clasp clamps the first sleeve portion against the first connector portion at a first clasp portion of the annular clasp, and clasps the strain relief at a second clasp portion of the annular clasp, the first clasp portion having a first thickness that is greater than a second thickness of the second clasp portion.

17. The welding system of claim 16, further comprising barbs positioned on the first connector portion of the connector, wherein the clasp comprises complementary barbs.

18. The welding system of claim 11, wherein the clasp comprises a first section and a second section coupled to the first section around the first connector portion, the first sleeve portion, and a portion of the strain relief.

19. The welding system of claim 11, wherein the strain relief comprises an annular trench and an inner surface of the clasp comprises an annular ridge that fits in and engages the annular trench.

20. The welding system of claim 11, wherein an inner surface of the clasp comprises an annular trench and the strain relief comprises an annular ridge that fits in and engages the annular trench.

* * * * *